May 3, 1938.  N. P. WORDEN  2,115,982
LAMP MOUNTING
Filed Oct. 30, 1935    2 Sheets-Sheet 1

INVENTOR
NORBERT P. WORDEN
ATTORNEYS

May 3, 1938. N. P. WORDEN 2,115,982
LAMP MOUNTING
Filed Oct. 30, 1935 2 Sheets-Sheet 2
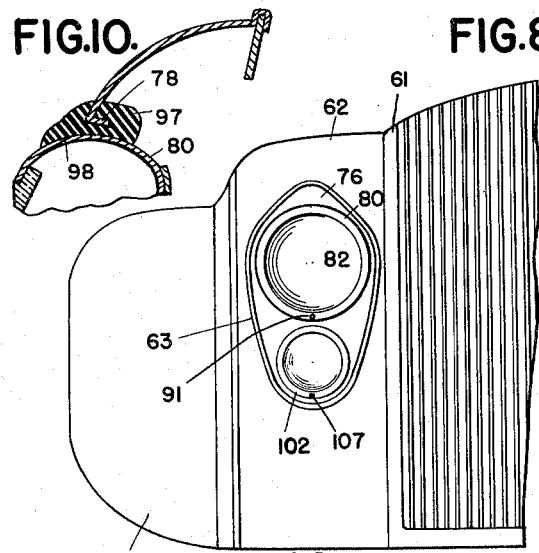
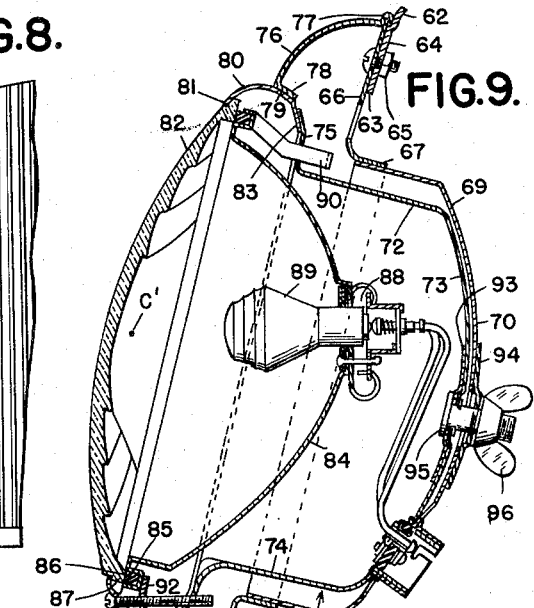
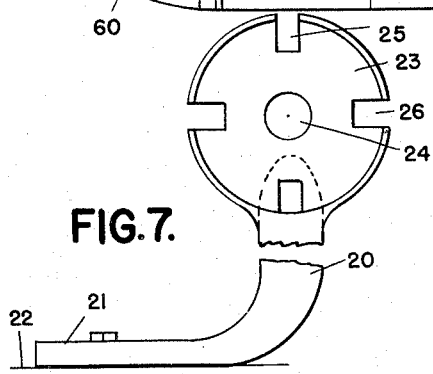
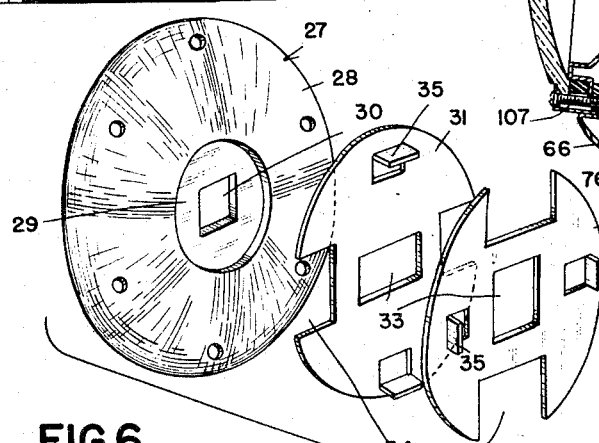
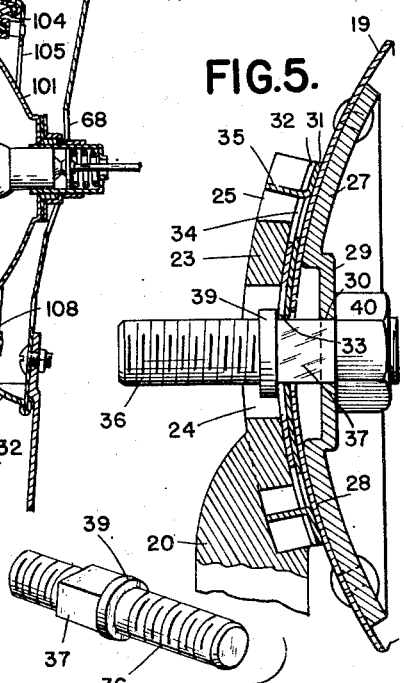
INVENTOR
NORBERT P. WORDEN
BY *Whittemore Hulbert*
*Whittemore & Belknap*
ATTORNEYS Patented May 3, 1938

2,115,982

UNITED STATES PATENT OFFICE 2,115,982

LAMP MOUNTING

Norbert P. Worden, Detroit, Mich., assignor to C. M. Hall Lamp Company, Detroit, Mich., a corporation of Michigan Application October 30, 1935, Serial No. 47,485

5 Claims. (Cl. 240—8.11)

The invention relates to lamps and lamp mountings for vehicles.

One of the objects of the invention is to provide a lamp mounting so constructed and arranged as to permit the body of the lamp to be wholly or partially concealed by the contour of the vehicle while at the same time making provision for adjusting the lamp to align the same correctly with the path of travel of the vehicle.

While the invention in its broader aspects may be used with air and water conveyances it is primarily intended for use in land vehicles such as automobiles and particularly for the head lamps of automobiles in which it is essential that the lamps be aimed so that the designed light distribution or beam may be properly located on the roadway. Therefore in the specific embodiments of the invention hereinafter more fully described, the head lamp is shown located within the contour of the vehicle body, fender or cowling and so mounted as to direct the light through an opening in said body, fender or cowling while maintaining substantially unbroken the designed effect of the vehicle such as a streamlined design.

The invention will be more readily understood by reference to the drawings, in which Figure 1 is a front view of a motor vehicle provided with headlights constructed in accordance with my invention;

Figure 5 is an enlarged vertical section through the adjustable mounting;

Figure 6 is a perspective view of certain parts shown in Figure 5;

Figure 7 is a front view of the mounting bracket;

Figure 8 is a front view of a vehicle showing a modified front end construction containing a concealed head lamp;

Figure 9 is a vertical section through the head lamp and mounting;

Figure 10 is a fragmentary section showing a modified form of mounting.

Figure 1:
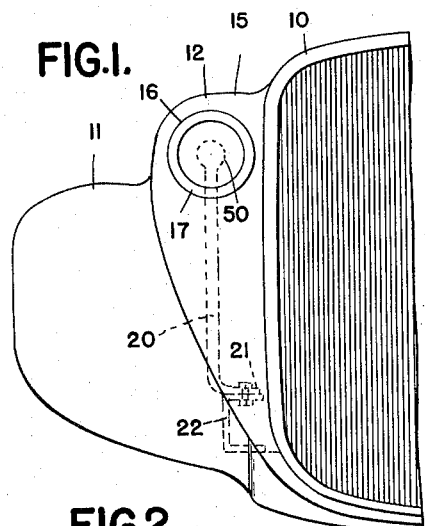
Figure 2:
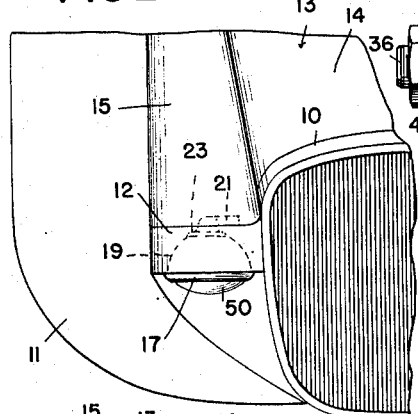
Figure 2 is a plan view of the front end of the motor vehicle.
Figure 3:
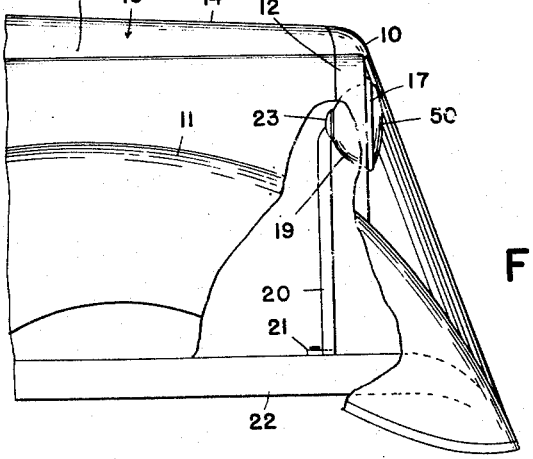
Figure 3 is a longitudinal section through the head lamp mounting with portions of the contour of the vehicle broken away.
Figure 4:
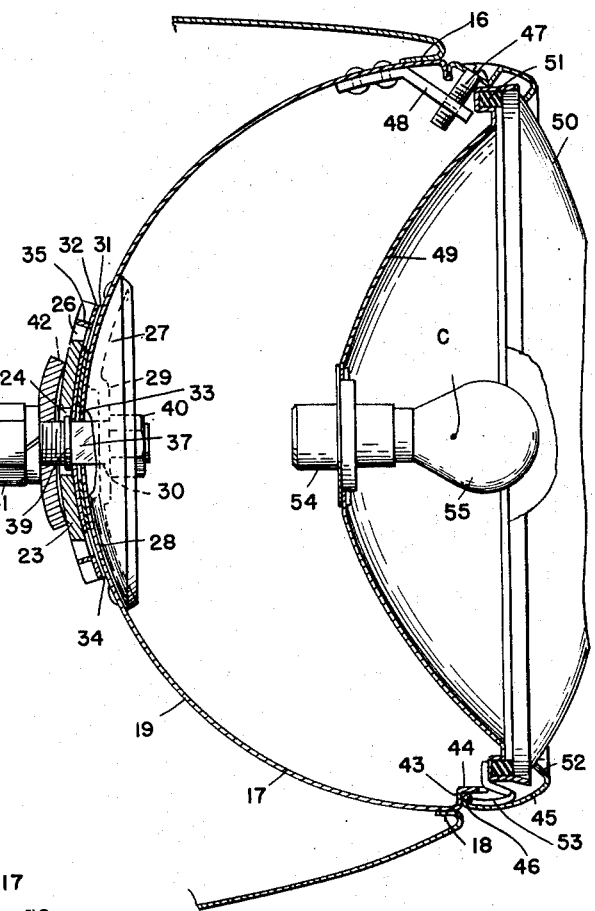
Figure 4 is an enlarged horizontal section through the lamp mounting.

Referring now to the construction illustrated in Figures 1 to 4, 10 is the radiator shell and 11 the fender of an automobile. The radiator shell has a lateral extension 12 extending toward the fender and having a curved contour adapted to merge with the fender to give a streamline effect. 13 is the hood which as shown has a top portion 14 aligning with the contour of the radiator shell and a side portion 15 aligning with the contour of the lateral extension 12. Said extension 12, which is preferably of sheet metal, is provided with a circular opening 16 for receiving the front end of the head lamp 17 and as shown the sheet metal has an inwardly return bent annular flange 18.

The lamp 17 has its outer casing or body 19 of spherical shape, the center of curvature being at the point marked C. The outer spherical surface of the lamp casing is thus fitted within the annular flange 18, which latter flange is also formed as a spherical segment about the same center C.

The lamp is supported in position by means of a strut 20 which as shown has a transversely extending flange or foot 21 adapted to be secured to the frame 22 of the vehicle. The upper end of the strut has an enlarged dished flange 23 of spherical contour in which there is a central aperture 24. The flange 23 also has peripheral notches 25 in vertical alignment and similar peripheral notches 26 in horizontal alignment. The rear end of the lamp casing 17 has a reinforcing liner 27 secured thereto, the peripheral portion 28 of which conforms to the inner spherical surface of the casing. The reinforcing liner has a depressed central web 29 with a rectangular aperture 30 therein. Between the outer spherical casing and the flange 23 are two adjusting washers 31 and 32, also of spherical contour. These washers are of identical construction having an oblong central aperture 33 with enlarged peripheral notches 34 in alignment with the length of the oblong aperture and the struck-out lugs 35 in transverse alignment. The two washers are assembled with the struck-out lugs at right angles to each other. The lugs on the inner washer engaging the vertical notches 25 and the lugs on the outer washer engaging the horizontal notches 26 on the supporting member 20. A bolt 36 has a squared shank 37 fitting the squared aperture 30 in the reinforcing liner and fitting also the width of the oblong apertures 33 in the washers. The bolt also has a flange 39 of smaller diameter than the aperture 24 engaging the outer washer. A nut 40 threadedly engaging the inner end of the bolt serves to draw the two washers and lamp casing into permanently adjusted position. The outer end of the bolt is also threaded for receiving a nut 41 which engages a clamping member 42 and secures the lamp assembly to the supporting flange 23.

With the construction as described, it will appear that by loosening the nut 41 on the bolt 36 the lamp casing may be adjusted both vertically and horizontally about the center C with respect to the support but the lamp cannot assume intermediate positions where the vertical axis of the lamp is inclined. In the vertical adjustment of the lamp, the lamp casing and bolt 36 are permitted to move in the oblong slot of the outer washer, the inner washer being permitted to move with the lamp casing by reason of its lugs moving vertically in the notches 25. Correspondingly in the horizontal adjustment of the lamp the bolt 36 is permitted to move through the oblong aperture in the inner washer while the lugs on the outer washer may move horizontally in the notches 26. When the lamp has been properly adjusted about each axis it may be maintained in final position by the nut 41 and clamp 42.

With the casing of the lamp as shown and described any suitable arrangement of reflector and lens may be employed. In the construction as shown the casing is provided with an inturned flange 43 terminating in an annular seat 44 of smaller diameter than the casing for receiving the lamp door 45. The door engages the lip 46 at one side of the casing and is fastened in position at the opposite side of the casing by means of the screw 47 which threadedly engages a bracket 48 within the casing. Demountable with the door 45 are the reflector 49 and lens 50, the latter being seated on the gasket 51 and held forwardly against the inturned flange 52 of the door by means of spring clips 53. The reflector is provided with a suitable socket 54 for receiving the lamp bulb 55.

In the construction as shown it will be evident that the door of the lamp projects beyond the sheet metal front of the vehicle and is exposed to view while the remainder of the lamp is entirely concealed. When the lamp is adjusted either about the vertical or horizontal axes, the spherical casing is only slightly adjusted with respect to the spherical inturned flange 18, thus permitting the proper aiming of the lamp without detracting from the appearance of the projecting portion of the lamp.

It should be understood however that instead of utilizing a lamp with the demountable door as illustrated, any other suitable front end construction for the lamp may be employed. For example, the spherical casing may have the front end portion terminating to provide the so-called doorless lamp construction such, for example, as is illustrated in the co-pending application of Foley and Anklam, Serial No. 754,900 filed November 26, 1934.

Another embodiment of my invention is illustrated in Figures 8 and 9. In this construction the front end of the vehicle has front fenders 60, front hood panel 61 concealing the radiator and fixed sheet metal panels 62 intermediate the fenders and hood panel extending upwardly and curving rearwardly to give a streamline effect. Each of the panels 62 forms a rigid part of the vehicle and has an opening 63 for the head lamp. The opening 63 which as shown is of elongated generally elliptical form in order to provide for two lamps to be mounted therein, is bounded by the flange 64 of the panel 62. Secured to the flange 64 by detachable mountings, such as the bolts and nuts 65, is a lamp supporting member 66 formed preferably of sheet metal. This member extends across the opening 63 and is provided with an inturned annular flange 67 in the upper portion and the aperture 68 in the lower portion thereof. A cup-shaped housing 69 has annular side walls welded or otherwise secured to the annular flange 67 and has an arcuate rear portion 70, the center of curvature of which is substantially at the point C'. The main head lamp 71 has a lamp casing 72, the rear surface 73 of which is spherical with its center of curvature also at the point C'. The casing has a forwardly extending cylindrical portion 74 terminating in an outwardly flaring flange 75.

A fixed door or trim panel 76 is secured to the flange 66 by the return bent flange 77 and the door has in its front face two circular openings through which the front end of the lamps may project. The upper opening is formed by the inturned annular flanges 78 which are slightly curved about the center C' in order to adjustably receive the similarly curved portions 79 of the ring member 80. This ring member has the inturned forwardly extending portion 81 for engaging the flange of the lens 82 and has the rearwardly inturned portion 83 for engaging the flange 75 of the lamp casing. The reflector 84 has a peripheral flange 85 in which a suitable gasket 86 is arranged to engage the rear face of the lens flange 87. The reflector is provided with a suitable socket 88 for receiving the lamp bulb 89. For retaining the lens and reflector in position there is a suitable bracket 90 in the upper portion of the lamp casing and there is a screw 91 at the lower portion thereof threadedly engaging the clip 92 which is adapted to bear against the lower flange of the reflector.

In order to adjust the head lamp 71 to aim the beam with respect to the vehicle, the lamp casing 72 is permitted to swivel about the center C' with respect to the fixed housing 70. The construction herein employed may be similar to that previously described in connection with the first head lamp mounting and illustrated in Figures 5 and 6. On the other hand, an alternate construction may be employed in which there is a simpler type of ball and socket universal mounting permitting limited adjustment about the center C'. Thus, as illustrated in Figure 9, the lamp surface 73 is reinforced by a liner 93 and the rear portion 70 of the fixed housing is provided with a clamping member 94. A headed bolt 95 and wing nut 96 serve to clamp the parts in adjusted position. By loosening the nut the lamp casing may be adjusted about the center C', thus moving the ring 80 with respect to the fixed arcuate portions 79.

Sometimes it is desired to have a gasket intermediate the relatively moving parts and one such modification is illustrated in Figure 10. The annular gasket 97 is fixed to the flange 78 and has an inner surface curved as shown at 98 to conform to the curvature of the ring member portion 79.

The lower lamp 100 is in the illustrated embodiment of the invention adapted to be non-adjustable since its main function is for a parking light and there is no necessity for accurately projecting the beam. This lamp therefore has a simple reflector 101 and lens 102 held together by the bezel 103 and spring clips 104. The rear end of the bezel is adapted to fit within the recessed portion 105 of the member 76 and is held in position by the lip 106 and the screw 107 engaging a threaded portion 108 secured to the member 76.

From the above description it will appear that I have provided lamp mountings by means of which a lamp which is almost entirely concealed beneath the contour of a motor vehicle may be accurately aimed with respect to the line of travel of the vehicle, both about a vertical axis and a horizontal axis. The construction is so designed that the adjustment of the lamp does not affect the appearance of the projecting face of the lamp with respect to the surrounding trim and a tight joint may be maintained to prevent the infiltration of moisture and dust within the reflector.

What I claim as my invention is:

1. In a lamp mounting, a strut provided at its upper end with an enlarged dished flange having a central opening, a set of substantially vertically aligned peripheral notches and a set of substantially horizontally aligned peripheral notches, a lamp having a casing adjacent said dished flange, and a connection between said lamp and strut permitting the lamp to be adjusted vertically and horizontally, including a reinforcing liner for the casing having a central web provided with a rectangular opening, two adjusting concavo-convex washers between said casing and dished flange, each of said washers having an oblong central opening and peripheral notches, lugs projecting from one of said washers and engaging the notches in the other washer and one set of notches in the flange, lugs projecting from the second washer and engaging the notches in the first mentioned washer and the other set of notches in the flange, a bolt having a squared shank engaging the openings in the flange, web and washers, a clamping plate on the bolt upon the outer side of the flange, and nuts engaging said bolt upon the outer side of said plate and upon the inner side of said web respectively.

2. In a lamp mounting, a dished supporting member having a central opening, a set of substantially vertically aligned peripheral notches and a set of substantially horizontally aligned peripheral notches, a lamp having a casing adjacent said dished member, and a connection between said lamp and member permitting the lamp to be adjusted vertically and horizontally, including a reinforcing liner for the casing having a central web provided with an opening, two adjusting concavo-convex washers between said casing and dished member, each of said washers having a central opening and peripheral notches, lugs projecting from one of said washers and engaging the notches in the other washer and one set of notches in the member, lugs projecting from the second washer and engaging the notches in the first mentioned washer and the other set of notches in the member, a bolt having a shank engaging the openings in the member, web, and washers, a clamping plate on the bolt upon the outer side of the member, and nuts engaging said bolt upon the outer side of said plate and upon the inner side of said web respectively.

3. In a lamp structure, a dished member having a central opening, a set of substantially vertically aligned openings and a set of substantially horizontally aligned openings, a light unit, and a mounting for said light unit permitting the unit to be adjusted vertically and horizontally relative to said dished member, including two adjusting concavo-convex washers cooperating with the dished member, each of said washers having a central opening and peripheral notches, lugs projecting from one of said washers and engaging the notches in the other washer and one set of openings in said member, lugs projecting from the second washer and engaging the other set of openings in said member, and a connection between the light unit and dished member including an elongated element extending through the central openings in said member and washers.

4. In a lamp mounting, a dished supporting member having a central opening, a set of substantially vertically aligned openings and a set of substantially horizontally aligned openings, a lamp casing adjacent said dished member, and a connection between said member and casing permitting the latter to be adjusted vertically and horizontally, including two adjusting concavo-convex washers between said casing and dished member, each of said washers having a central opening and peripheral notches, lugs projecting from one of said washers and engaging the notches in the other washer and one set of openings in said member, lugs projecting from the second washer and engaging the notches in the first mentioned washer and the other set of openings in said member, a bolt carried by the casing engaging the central openings in the member and washers, and clamping means on said bolt engaging said dished supporting member.

5. In a lamp mounting, a supporting member provided with a dished portion having a central opening, a set of substantially vertically aligned openings and a set of substantially horizontally aligned openings, a lamp casing adjacent said dished portion, and a connection between said casing and member permitting the casing to be adjusted vertically and horizontally, including a reinforcing liner for the casing having a central web, two adjusting concavo-convex washers between said casing and dished portion, each of said washers having an oblong central opening and peripheral notches, lugs projecting from one of said washers and engaging the notches in the other washer and one set of openings in the dished portion, lugs projecting from the second washer and engaging the notches in the first mentioned washer and the other set of openings in the dished portion, a bolt carried by said web and casing and engaging the central openings in the washers and dished portion, and clamping means on the bolt engaging the dished portion aforesaid of the supporting member.

NORBERT P. WORDEN.